March 17, 1925.
A. L. RYAN
1,530,094
AUTOMATIC TIRE VALVE
Filed March 3, 1924.
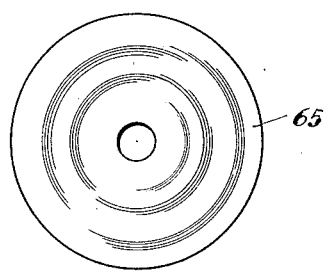
Fig. 3
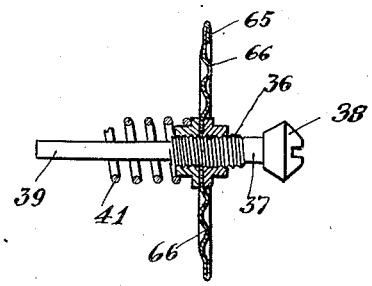
Fig. 2
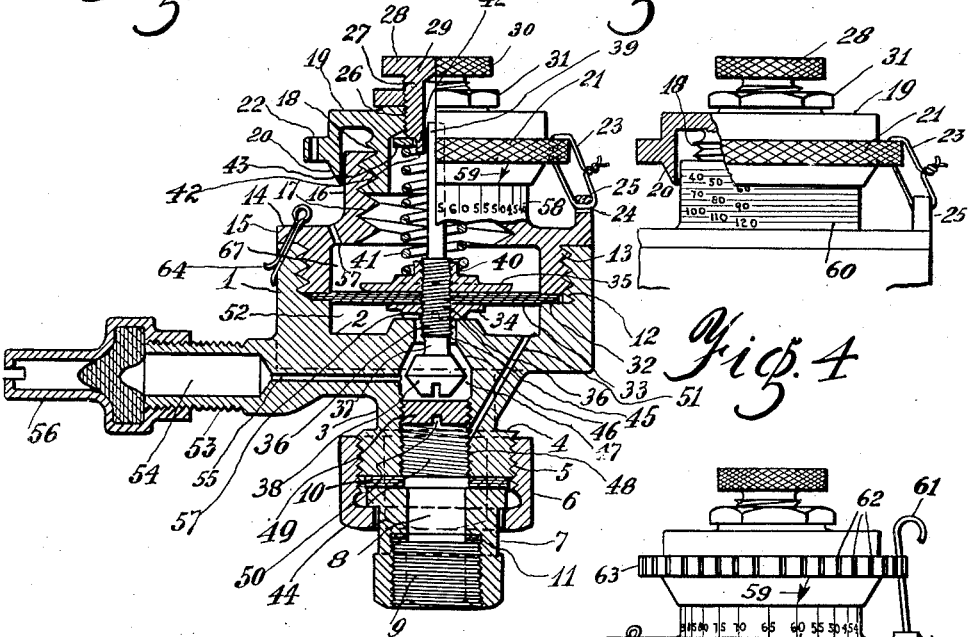
Fig. 4
Fig. 1
Fig. 5
Inventor:
ALVA L. RYAN.
Attorneys.

Patented Mar. 17, 1925.

1,530,094

UNITED STATES PATENT OFFICE.

ALVA L. RYAN, OF PITTSBURGH, PENNSYLVANIA, ASSIGNOR OF ONE-HALF TO WILLIAM J. ARTZ, OF PITTSBURGH, PENNSYLVANIA.

AUTOMATIC TIRE VALVE.

Application filed March 3, 1924. Serial No. 696,498.

*To all whom it may concern:*

Be it known that I, ALVA L. RYAN, a citizen of the United States, residing at Pittsburgh, in the county of Allegheny and State of Pennsylvania, have invented certain new and useful Improvements in Automatic Tire Valves, of which the following is a specification.

This invention relates to valves and more particularly to automatic tire valves.

The principal object of this invention is to provide a tire valve which will automatically cut off the supply of compressed air after a tire has been inflated to a predetermined pressure. Another object is to devise such a valve which can be regulated at will to operate at any desired pressure, within reasonable limits. A further object is to produce a valve of this character which is of such proportions and design as to be readily applicable to the various types of pneumatic tires now used on vehicles of all kinds. Additional features will be dealt with in due course in this description, viewed in connection with the appended drawing forming a part of this application.

In the drawings:—

Fig. 1 is a much enlarged vertical cross-sectional view taken substantially through the middle of the valve.

Fig. 2 is a cross-section showing a modified construction of a diaphragm member used in the valve.

Fig. 3 is an end view of the diaphragm shown in Fig. 2.

Fig. 4 is a fractional view showing a modified pressure reading scale.

Fig. 5 is a fractional view showing an alternative method of locking the adjusting cap of the automatic tire valve.

Referring to Fig. 1 in particular, the automatic tire valve is composed of a valve body 1 of cylindrical shape, open at the top and having a bottom 2 centrally drilled and provided with a shank 3 the lower part 4 of which is enlarged to accommodate a thread 5 which is engaged by a coupling 6, of usual design, by means of which is securely held a flanged union 7 having a central aperture 8 and a suitable inside threaded portion 9 by which the valve may be screwed onto the tire valve (not shown) with which all pneumatic tires are sold nowadays. A large gasket 10 is placed between the union 7 and the shank 3 and a smaller gasket 11 is introduced into the union to provide airtight connections between the automatic valve and the tire.

The open end of the valve body has an inward thread 12 which is engaged by the correspondingly threaded portion 13 of the valve cover 14 having a flange 15 and a central, upwardly directed, hub 16 provided inside with a coarse thread 17 which receives the similarly and outwardly threaded shell 18 of the adjusting cap 19. The lower end of the latter is preferably beveled, see numeral 20, and has an intermediate knurled flange 21 in which a series of apertures 22 have been drilled for locking the cap to the valve cover by means of a sealing wire 23 which is also passed through a hole 24 drilled in a suitable lug 25, cast upon said cap.

The top of the adjusting cap has a threaded central aperture 26 into which is screwed the threaded hollow body 27 of the adjusting screw 28 having a flanged head 29, the side of which is provided with knurls 30 to facilitate its manipulation. A lock-nut 31 is also screwed upon the adjusting screw to hold it in the selected position.

Clamped between the lower part 13 of the valve cover and the circular seat 32 provided in the valve body is a diaphragm 33, preferably made of resilient rubber for the smaller sizes of valves. In the center of said diaphragm are positioned a lower clamping disc 34 and an upper disc 35, both centrally threaded to receive the threaded portion 36 of the stem 37 of a conic valve member 38, having also a reduced upward extension 39 acting as a guide-stem. The upper clamping disc is furnished with a collar 40 which serves as a centering means for the lower end of a calibrated compression coil spring 41, the upper end of which is guided by a collar 42 cut on the end of the adjusting screw and rests against a washer 43 also engaging said last mentioned collar.

In the shank and bottom of the valve body is a central aperture 44 which is divided into four distinct sections, namely, the reduced aperture 45, the conical valve seat 46 for the valve member, the air inlet chamber 47 and the threaded portion 48; the last two parts being separated by a threaded plug 49 having a screw driver-slot 50 to facilitate its insertion and adjustment.

A duct 51 is provided between the lower diaphragm chamber 52 and the portion of the central aperture 44 situated below the plug 49, thereby establishing a permanent connection between the valve and the air chamber of the tire and equalizing the air pressure therein.

The supply of compressed air is introduced into the automatic valve through the lateral connecting nipple 53 formed integrally with the valve body. This nipple is centrally drilled to two different diameters 54 and 55, the latter being very much smaller than the former to prevent a too violent inrush of compressed air in the valve, and it is directed to a point in the air inlet chamber below the valve seat, so as to never be closed by the valve member 38. When not in use for inflating a tire, the nipple is sealed by means of a commercial tire valve cap 56 too well known in the art to require further detailed description.

It will be understood that the strength of the spring 41 is calibrated to operate against the air pressure acting on the underside of the whole diaphragm. In order to enable the latter to act as soon as the selected pressure has been reached in the tire, it is necessary to provide some connection between the air inlet chamber and the diaphragm chamber; this is effected in Fig. 1 by cutting one or more small grooves 57 in the lower clamping disc 34, this connection being, of course, interrupted when the pressure within the tire causes the valve member to close on its seat. An air vent 57 is also provided in the valve cover to maintain the upper diaphragm chamber 67 always at atmospheric pressure.

The preferred construction is to provide an automatic tire valve which is designed to operate at pressures varying from a certain minimum, say twenty five pounds per square inch, to a maximum pressure of say one hundred and twenty pounds per square inch. In the construction shown in Figs. 1 and 5, the coarseness of the thread 17 is such that a single full turn of the adjusting cap will produce the whole range of adjustment from twenty five pounds to one hundred and twenty pounds per square inch. The pressure scale required for this type is shown by the numeral 58 on the hub 16; a pointer-arrow 59 being provided on the beveled edge of the adjusting cap.

In the construction shown in Fig. 4, the thread 17 is made much finer, thus requiring several turns of the adjusting cap 19 to cover the whole range of operating pressures. In this case the pressure scale is formed of a series of parallel circular lines 60 upon which the corresponding pressures are marked, the lower edge of the beveled adjusting cap being used to read the pressures.

Fig. 5 depicts another, and more rapid, method of locking the adjusting cap into any selected position. It consists of a spring catch 61 secured to the valve cover and which engages one of a series of slots 62 cut in the periphery of the flange 63. The valve cover is usually locked on the valve body by means of a cotter-pin 64 which is applied after the parts have been properly assembled.

The diaphragm construction shown in Figs. 2 and 3 is intended to be used on pressure valves of greater size and greater range of pressures than usually prevailing in automobile tires. Its construction differs from the one already described only in the fact that a metal diaphragm 65, having concentric grooves or corrugations 66 is used instead of a rubber diaphragm.

Based on the foregoing description, the method of operation will be readily understood and is as follows: Assuming that, as shown in Fig. 1, the valve be set to operate at fifty pounds pressure, the following adjustments are made: The calibrated spring is first permanently set for the minimum pressure, say twenty five pounds per square inch, by means of the adjusting screw 28 and the lock nut 31, and then the additional pressure on said spring is obtained by screwing down the adjusting cap 19 until the pointer reads on the fifty pound graduation. The tire cap 56 is now removed and the air supply hose is applied to the nipple 53. The air will then enter the air inlet chamber 47, pass through the reduced aperture 45 and through the equalizing duct 51 into the tire, until the predetermined pressure therein will cause the valve member 38 to close upon its seat and cut off the air supply to the tire.

The automatic tire valve may also be used indirectly to measure, approximately, the air pressure in a tire in the following manner: The sealing wire 23 is removed and the adjusting cap is unscrewed until the pointer reads on the minimum pressure, say again twenty five pounds per square inch. The tire cap 56 is now removed and the adjusting cap is again screwed down until the compression in the calibrated spring will be sufficient to force the valve member from its seat, thereby letting the air confined in the tire escape through the nipple, which fact will be ascertained by the noise produced by the escaping air. The reading indicated by the pointer will tell with sufficient accuracy the air pressure in the tire.

Many changes in the precise construction, arrangement and combination of the various parts may be made without exceeding the scope of the claims, and I reserve myself the liberty of making all such changes as may be thought desirable.

What I claim is:—

In a tire valve, the combination of a valve body; a valve cover; means to connect said tire valve to a tire and to a supply of fluid pressure; a diaphragm member positioned and secured within said body and acted upon by said fluid pressure; an adjustable valve member adapted to interrupt the supply of fluid pressure into said tire upon reaching a predetermined pressure therein; means provided on said valve member for simultaneously securing same to said diaphragm and strengthening the latter; an upwardly directed extension formed integrally with said valve member for guiding same; a spring member operating upon said diaphragm to normally establish said supply of fluid pressure into said tire; an adjusting screw acting upon said spring member and adapted to determine the minimum operating pressure of said valve member, and a threaded adjusting cap adapted to regulate the operating pressure of said valve member greater than said minimum pressure; the thread on said adjusting cap being such as to cover the whole range of pressures above said minimum pressure in a single turn.

In testimony whereof I affix my signature.

ALVA L. RYAN.